United States Patent
Suttle et al.

(10) Patent No.: US 8,679,564 B2
(45) Date of Patent: Mar. 25, 2014

(54) PET FOOD PRODUCT BANDOLIER

(75) Inventors: James Suttle, Franklin, TN (US); Robert Brandt, Franklin, TN (US)

(73) Assignee: Mars, Incorporated, McLean, VA (US)

(*) Notice: Subject to any disclaimer, the term of this patent is extended or adjusted under 35 U.S.C. 154(b) by 208 days.

(21) Appl. No.: 12/880,694

(22) Filed: Sep. 13, 2010

(65) Prior Publication Data

US 2011/0217422 A1    Sep. 8, 2011

Related U.S. Application Data

(60) Provisional application No. 61/241,720, filed on Sep. 11, 2009.

(51) Int. Cl.
*A23P 1/10* (2006.01)

(52) U.S. Cl.
USPC ............ 426/512; 426/76; 426/516; 426/518; 426/523; 426/524; 426/805; 119/710; 425/217; 425/294; 425/407; 425/408; 425/DIG. 109

(58) Field of Classification Search
USPC ........... 426/76, 512, 514–516, 518, 520, 523, 426/524, 805; 119/709–711; 425/217, 294, 425/407, 408, DIG. 109
See application file for complete search history.

(56) References Cited

U.S. PATENT DOCUMENTS

| | | | | |
|---|---|---|---|---|
| 1,523,870 A | * | 1/1925 | Forte | 426/76 |
| 1,836,604 A | * | 12/1931 | Meyer | 127/30 |
| 1,891,744 A | * | 12/1932 | Blair | 264/563 |
| 2,448,786 A | * | 9/1948 | Faxon | 425/134 |
| 3,303,796 A | * | 2/1967 | Novissimo | 426/5 |
| 3,410,699 A | * | 11/1968 | Peters | 426/104 |
| 4,543,684 A | | 10/1985 | Bandoh | |
| 4,543,769 A | * | 10/1985 | Schmitz | 53/450 |
| 4,636,597 A | * | 1/1987 | Menche | 200/438 |
| 4,829,682 A | | 5/1989 | Gasbarro | |
| 4,839,110 A | | 6/1989 | Kingsbury | |
| 5,358,727 A | * | 10/1994 | Yates et al. | 426/512 |
| D354,613 S | * | 1/1995 | Kreger | D1/124 |
| 5,388,489 A | * | 2/1995 | Dayley | 83/117 |
| 5,437,758 A | | 8/1995 | Walsh | |
| 5,733,587 A | * | 3/1998 | Ream et al. | 425/237 |
| 5,902,621 A | * | 5/1999 | Beckett et al. | 426/279 |
| 6,009,690 A | * | 1/2000 | Rosenberg et al. | 53/454 |
| 6,117,477 A | * | 9/2000 | Paluch | 426/623 |
| 6,165,531 A | * | 12/2000 | Harding et al. | 426/512 |
| 6,182,556 B1 | | 2/2001 | Nelson et al. | |
| 6,217,309 B1 | * | 4/2001 | Jens et al. | 425/235 |
| 6,261,620 B1 | * | 7/2001 | Leadbeater | 426/515 |
| 6,455,083 B1 | * | 9/2002 | Wang | 426/104 |
| 6,488,939 B1 | | 12/2002 | Zeidler | |
| 6,669,883 B1 | | 12/2003 | Rosenberg | |
| 6,878,390 B2 | * | 4/2005 | Murray et al. | 426/76 |
| 8,012,522 B2 | * | 9/2011 | Ornelaz, Jr. | 426/389 |
| 2002/0176918 A1 | * | 11/2002 | Willcocks et al. | 426/512 |

(Continued)

*Primary Examiner* — Drew E Becker

(74) *Attorney, Agent, or Firm* — Tracey S. Truitt; Polsinelli PC

(57) ABSTRACT

Aspects of the present invention are directed to methods for manufacturing shaped, comestible articles. Multiple comestible articles are connected by flash, and stress lines in the flash surround the articles. The comestible articles are subsequently separated from the flash at the stress lines. Additional aspects of the present invention are directed to an intermediate comestible product. In certain embodiments, the intermediate comestible product comprises multiple articles, web-like flash connecting the articles, and stress lines formed in the flash and about each article.

22 Claims, 9 Drawing Sheets

(56) References Cited

U.S. PATENT DOCUMENTS

| | | | |
|---|---|---|---|
| 2003/0035870 A1* | 2/2003 | Ackley et al. | 426/383 |
| 2005/0084577 A1* | 4/2005 | Rothamel et al. | 426/512 |
| 2006/0024411 A1 | 2/2006 | Pontzer | |
| 2007/0228112 A1 | 10/2007 | Shi | |
| 2008/0241326 A1* | 10/2008 | Ekberg | 426/512 |
| 2011/0086130 A1* | 4/2011 | Axelrod | 426/19 |

* cited by examiner

PET FOOD PRODUCT BANDOLIER

RELATED APPLICATIONS

This application claims the priority benefit of U.S. Provisional Patent Application Ser. No. 61/241,720, filed on Sep. 11, 2009, the teaching and contents of which are hereby incorporated by reference.

TECHNICAL FIELD

Aspects of the present invention relate to the manufacture of comestible articles, and more particularly, to the formation of shaped comestible articles and a continuous process.

BACKGROUND

As of 2006, the number of pets in the United States outnumbered the number of people by 60 million, resulting in over $35 billion spent by US consumers per year on pet care. A significant portion of these pet care costs are spent on pet foods. In recent years, an emphasis has been placed on developing healthier and more palatable pet foods. Less work, however, has been directed to the methods used to make these pet foods. With such a large amount of money spent per year on pet foods, improved methods for their manufacture could result in substantial increases in profit margins for pet food manufacturers.

Often, traditional pet foods are formed by extrusion: ingredients are mixed and passed through an extruder, and the resultant extrudate passes through a nozzle, is cut to a certain size, and subsequently dried. Although this method is suitable for high throughput formation of large quantities of pet foods, the resultant product is usually in the form of a basic, low-resolution shape such as a cylinder or sphere.

When pet foods with intricate shapes and high-resolution structures are desired, extrusion techniques are not suitable and alternative techniques such as die stamping, forging, book molding, and injection molding are used. These alternative techniques are often time consuming, lead to large amounts of waste, and are not conducive to high-throughput manufacturing. Improvements to pet food manufacturing technology would be desirable.

SUMMARY

Aspects of the present invention are directed to methods for manufacturing shaped, comestible articles, and the corresponding product. In certain embodiments, the methods comprise providing a pair of rollers, at least one of the rollers having cavities, each cavity at least partially surrounded by a rim; feeding a comestible material, having a temperature greater than its glass transition temperature, to the rollers; rotating the rollers to compress the material such that (i) material fills the cavities to form shaped articles (ii) material forms flash connecting the shaped articles together, and (iii) each rim forms a stress line in the flash about each article; and cooling the flash to reduce the temperature of the stress line to less than its glass transition temperature.

Additional aspects of the present invention are directed to an intermediate comestible product. In certain embodiments, the intermediate comestible product comprises a comestible material, comprising multiple articles, web-like flash connecting the articles together and having a thickness of between about 5 and about 20 thousandths of an inch, and stress lines formed in the flash having a thickness of between about 0.005 and 0.01 inches, wherein each article has a thickness of between about 0.060 inches and about 0.75 inches and a length of between about 0.5 and 1.5 inches.

DETAILED DESCRIPTION OF ILLUSTRATIVE EMBODIMENTS

Figure 1:
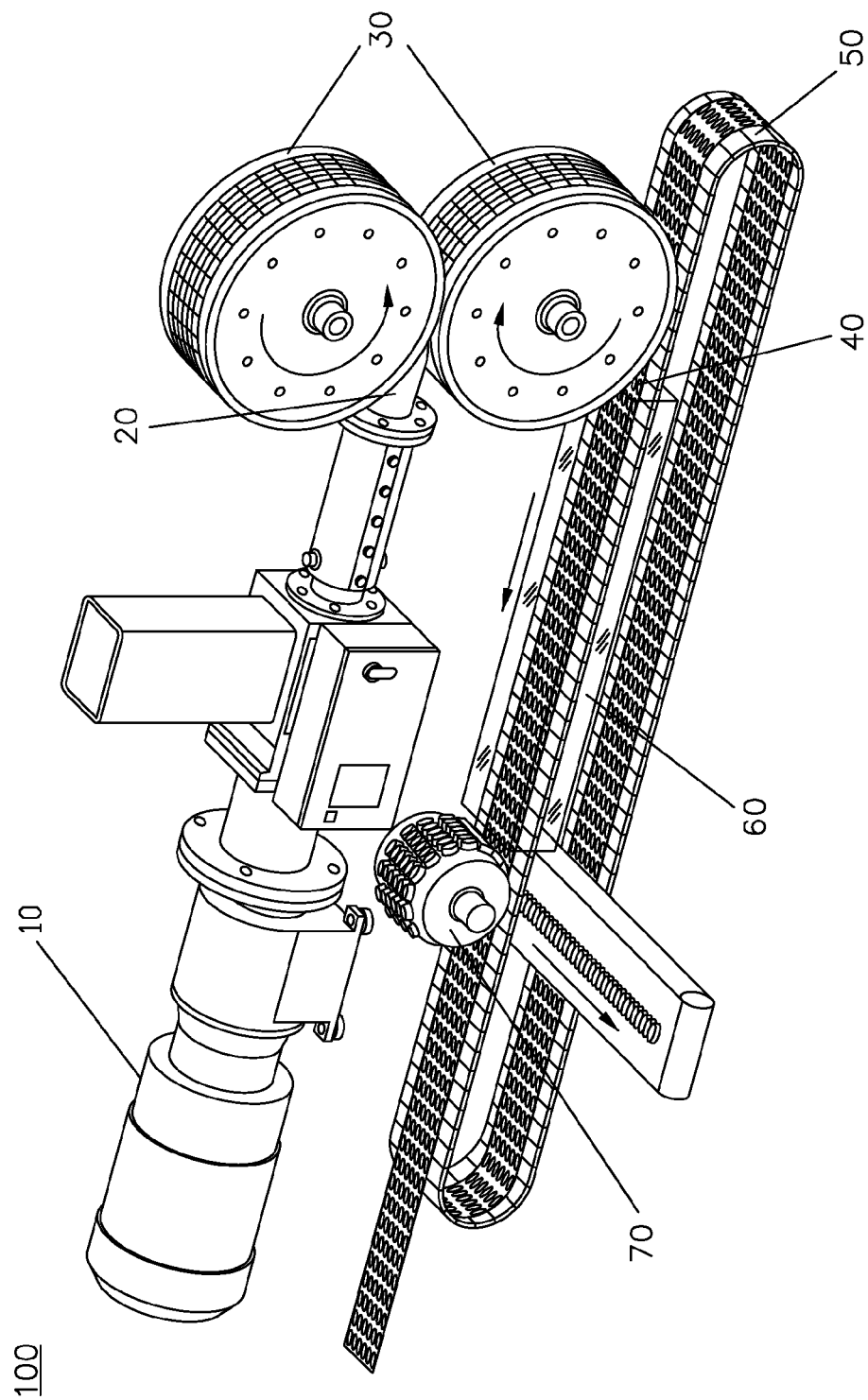
FIG. 1 shows a schematic of an exemplary apparatus for manufacturing shaped, comestible pet food articles.

Aspects of the present invention are directed to methods for manufacturing shaped, comestible articles that provide for significant benefits over traditional methods. These benefits include the ability to form articles in a high-throughput manufacturing process. FIG. 1 is a perspective view of an exemplary apparatus 100 for manufacturing shaped, comestible articles. Raw ingredients are added to an extruder 10 and formed into an extrudate (not shown), which preferably is comestible material upon exiting extruder 10. The extrudate is then injected by a nozzle 20 between a pair of rollers 30. Rollers 30 have cavities 32 formed into their faces to receive the comestible material. Rollers 30 are rotated to compress or shape the comestible material to form articles attached by flash to form a bandolier 40. Bandolier 40 is transferred to a conveyor belt 50. Conveyer belt 50 passes bandolier 40 through a cooling apparatus 60 wherein bandolier 40 is at least partially cooled. Following cooling, the articles are separated from the flash by a rotary punch 70.

As shown in FIG. 1, extruder 10 is a single screw extruder, but it is understood that alternative extruders are within the scope of the present application. For example, a dual screw extruder may also be used to form a suitable comestible material. In certain embodiments, the extruder is a single screw extruder (Bonnott 2" diameter) with jacketed barrels. The raw ingredients added to the extruder may vary depending upon the desired comestible article. Suitable ingredients include gelatin, proteins, including wheat and soy proteins, glycerin, oils, vitamins, minerals, flavorings, and fillers. In certain embodiments the raw material is in the form of pellets. A liquid may be added to the raw material to form a comestible material. In preferred embodiments, the comestible material is in the form of a slurry. For example, the comestible material may comprise between about 5 and about 20 weight percent water. Preferably between about 6 and about 18 weight percent water. More preferably between about 9 and about 13 weight percent water. Preferably, the comestible material is heated during the mixing and extrusion process, for example to a temperature of between about 100° F. and about 300° F., preferably between about 150° F. and about 250° F., more preferably between about 175° F. and about 225° F. Preferably, the temperature of the comestible material is above its glass transition temperature.

As understood by persons familiar with extrusion technology for food, the operating parameters of the extruder may vary depending upon the desired characteristics of the comestible material. Preferably, the comestible material has sufficient thermal setting characteristics to allow rapid production of articles without loss of resolution due to post forming material creep. For example, the comestible material may include additional ingredients to modify its consistency, such as, for example, binders and/or gelling agents. In certain embodiments, the comestible material comprises between about 10 and about 50% gelatin, preferably between about 20 and about 40% gelatin, more preferably between about 25 and about 35% gelatin. The viscosity of the comestible material may also aid in the reduction of post forming material creep. In certain embodiments, the viscosity of the comestible material is between about 200,000 cps and about 50,000 cps, preferably between about 150,000 cps and about 75,000 cps, more preferably between about 100,000 cps and about 90,000 cps.

Following extrusion, the comestible article is injected from the extruder to a pair of rollers 30 by nozzle 20. Preferably, nozzle 20 is designed to maximize the fill in the cavities 32 of rollers 30 and to optimize the amount of scrap or flash. Nozzle 20 may have an outlet of any shape for feeding rollers 30. In one embodiment, nozzle 20 is rectangular to provide a ribbon across the face of rollers 30.

Figure 2:
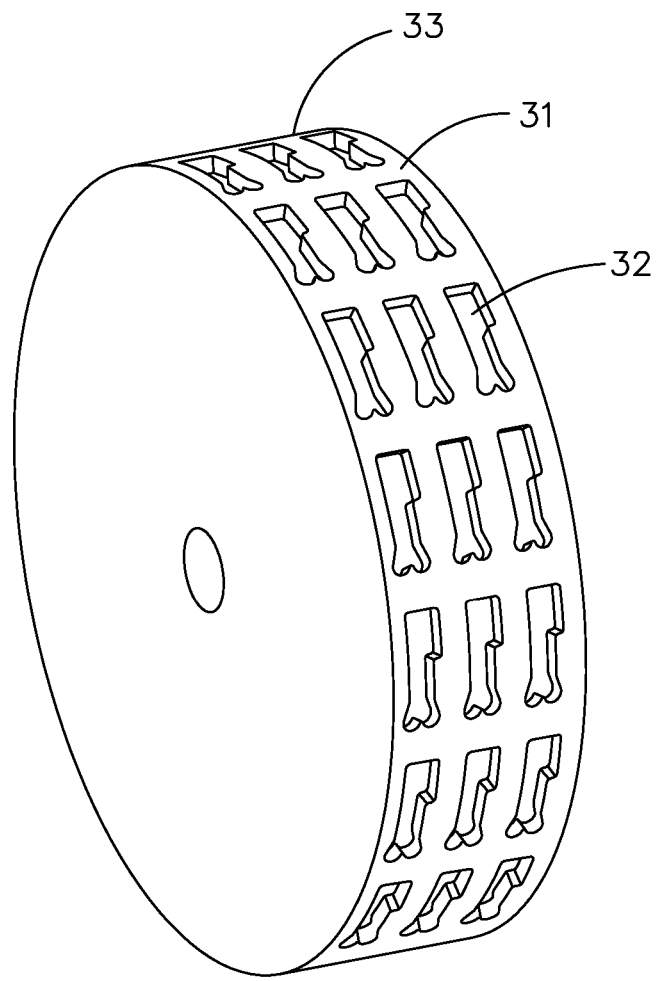
FIG. 2 shows an exemplary roller for manufacturing shaped, comestible pet food articles.

FIG. 2 shows an exemplary roller 30 having a cylindrical surface 31 and cavities 32 for forming comestible articles. Cavities are situated on the roller in rows 33. Although three rows 33 are exemplified, the number of rows 33 on roller 30 may vary depending upon the needs of the users. As exemplified, all cavities 32 on roller 30 have the same size and shape. In certain embodiments, however, cavities 32 may have different sizes and shapes. For example, roller 30 may have multiple rows 33, each row 33 having a different size and/or shape of cavity 32.

Figure 3A:
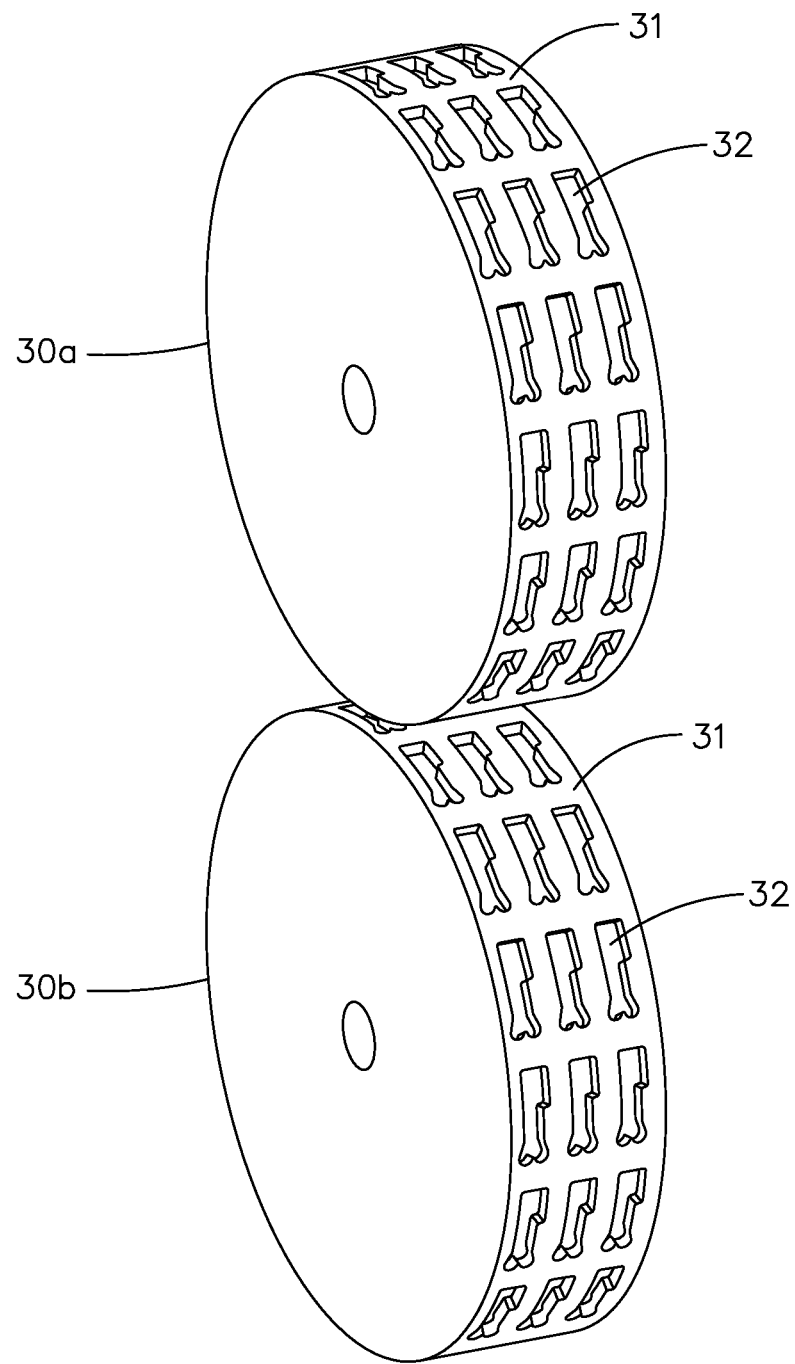
FIG. 3A shows a pair of exemplary rollers for manufacturing shaped, comestible pet food articles.

Cavities 32 may be on only one roller such that the resulting article will have the shape of the cavity on one side and will have a flat or approximately flat surface on the other side. In embodiments where cavities 32 are only on one roller, the roller may be rotated against an additional roller with a flat surface or another component having a flat surface, such as, for example a belt. Alternatively, cavities 32 may be on both rollers 30a and 30b, as best shown in FIG. 3A. Each one of the upper and lower rollers 30 has the same or corresponding shaped cavity 32 as the opposing roller such that one roller (30a or 30b) forms a top or first side of the article and the opposing roller (the other of 30b or 30a) forms the bottom or second side of the article. The cavities on one roller are aligned to coincide with cavities on the opposite roller, and the rollers are registered and timed for alignment to produce an article being shaped on both sides. In another embodiment, cavities 32 may be on only one roller and the other roller may comprise convex portions (not shown) that extend from the roller surface and correspond to the cavities 32 of the opposite roller such that roller with the cavities forms a shaped side of the article and the roller with the convex portion forms a pocket or void within the article.

Rollers 30 rotate in opposite rotational directions. For example top roller 30a rotates in a counterclockwise direction, and bottom roller 30b rotates in a clockwise direction. Preferably, rollers 30 feed bandolier 40 onto conveyer belt 50.

The rotational speed of rollers 30 may be chosen according to conventional processing parameters, such as desired properties of the bandolier output given the properties of the extrudate and to correspond to the rotational speed of the extruder and the linear speed on conveyer belt 50. In certain embodiments, rollers 30 move at a rotational speed of between about 1 and about 10 revolutions per minute (rpm). Preferably, rollers 30 move at a rotational speed of between about 2 and about 8 rpm. More preferably, rollers 30 rotate at a rotational speed of between about 4 and about 6 rpm.

Figure 3B:
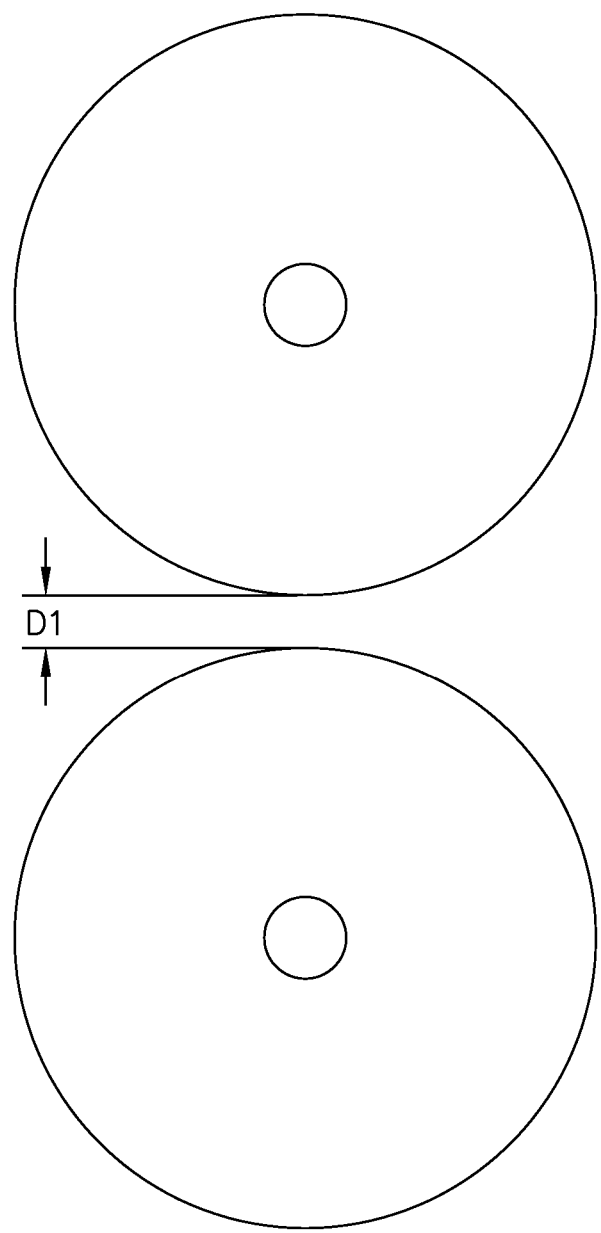
FIG. 3B shows a side view of a pair of exemplary rollers for manufacturing shaped, comestible pet food articles.

Rollers 30 may be spaced at a distance D1, as illustrated in FIG. 3B. D1 is defined as the distance between the pitch circles of the rollers. For example, for rollers 30 that are right cylindrical surfaces that are aligned to produce a uniform spacing, distance D1 is the distance between opposing, spaced apart surfaces 31 of the two rollers at their closest point. In certain embodiments, D1 is between about 0.01 inches and about 0.1 inches, preferably between about 0.03 inches and about 0.07 inches.

As the comestible material is fed from nozzle 20 into the space between rollers 30, the rollers apply a force to the comestible material to squeeze or compress the material into the cavities 32. The output of rollers 30 is bandolier 40, which includes articles 41 and flash 42, as explained more fully below. The amount of force required is dependent upon parameters such as the viscosity of the comestible material and the desired hardness of the resultant article, among other parameters that will be apparent to persons familiar with food processing technology and established principles. In certain embodiments, the amount of force applied is between about 500 lbs and about 4000 lbs, preferably between about 1000 lbs and about 3000 lbs, more preferably between about 1500 lbs and about 2000 lbs.

The comestible material may be cooled while being compressed by rollers 30. In certain embodiments, the comestible material is cooled by being contacted by cooled rollers 30. The rollers may be cooled to a temperature of between about 20 and about 80° F., preferably between about 30 and about 60° F., more preferably between about 40 and about 50° F. Cooling of the comestible material while compressing between rollers assists in solidifying the material.

Figure 4A:
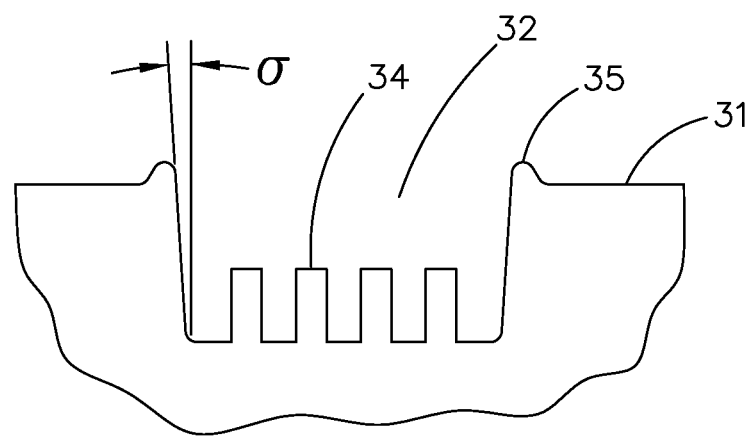
FIG. 4A shows a cross sectional view of an exemplary cavity with an exemplary roller for manufacturing shaped, comestible pet food articles.
Figure 4B:
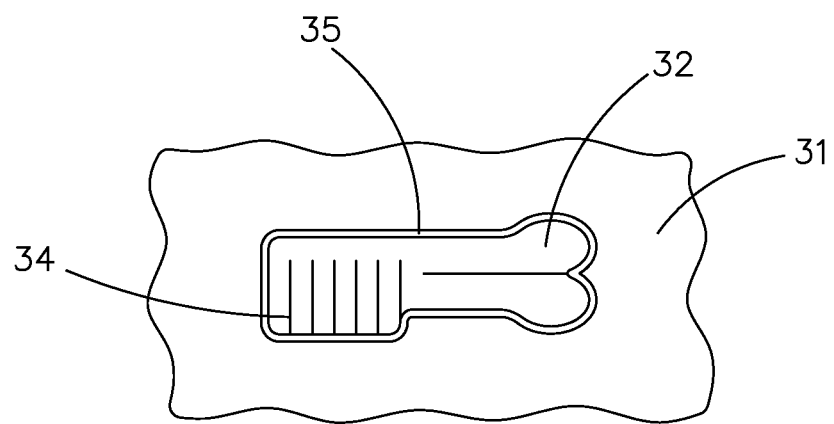
FIG. 4B shows a top view of an exemplary cavity with an exemplary roller for manufacturing shaped, comestible pet food articles.

FIGS. 4A (top view) and 4B (side view) show a portion of the roller surface 31 and cavity 32 within roller 30. The overall dimension of cavity 32, and therefore articles 41, may vary depending upon size of the comestible articles desired. In the embodiment shown in the figures, the cavities have a length and a width of between 0.5 and 5 inches, and more preferably between about 1 and 2 inches. The shape of the cavity may also vary. In embodiments wherein the roller surface has convex portions, the size and shape of the convex portion may vary depending upon the size and shape of the comestible article desired. A benefit of the present invention is the ability for a wide array of shapes to be formed using the disclosed process. For example, the shaped articles may be in the shape of vegetables, fruits, animals, and the like. In a preferred embodiment, the shape of the cavity is in the form of toothbrush, such as, for example, the shape of a Greenies® Mini Bite.

Cavity 31 is surrounded by a rim 35, as best shown in FIG. 4A. Rim 35 extends radially outwardly from surface 31 and has an inboard wall that smoothly merges into the wall of cavity 31. Rim 35 may extend from surface 31 from between about 0.01 and about 0.1 inches, preferably between about 0.02 and about 0.05 inches. Rim 35 may have a thickness of between about 0.01 and about 0.1 inches. Preferably, rim 35 is precisely aligned with either a surface 31 surrounding the cavity 32 on the opposing roller 30 or with a matching rim 35 on the opposing roller. In certain embodiments, the cavity is at least partially surrounded by the rim. Preferably, the rim is continuous about the cavity.

Figure 5A:
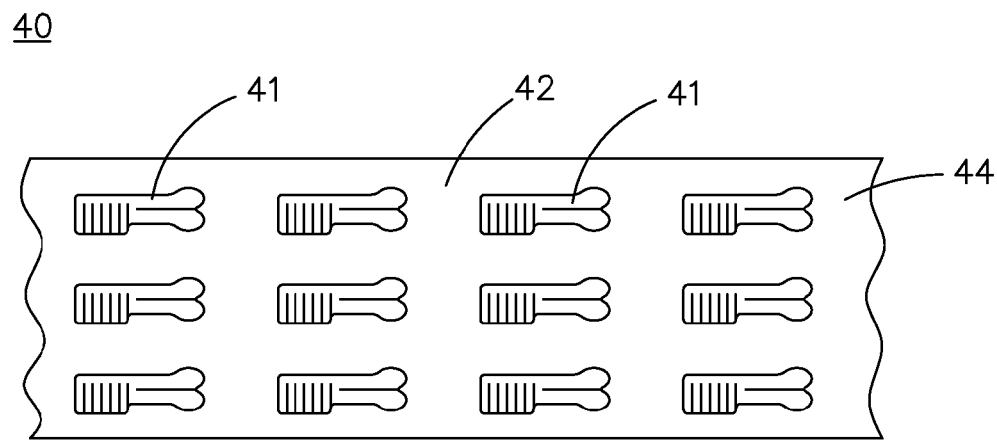
FIG. 5A shows a top view of an exemplary pet food bandolier.
Figure 5B:
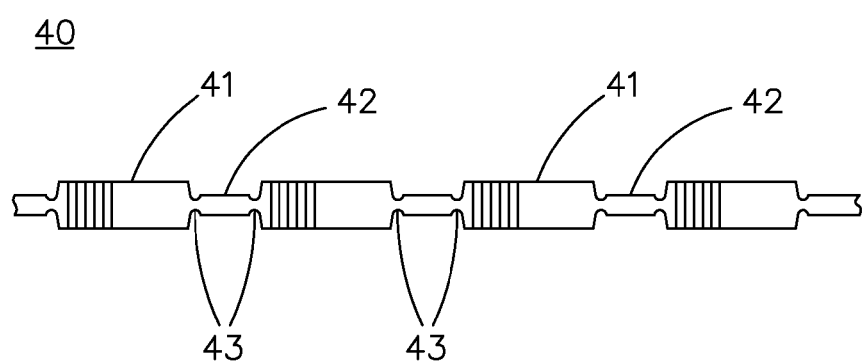
FIG. 5B shows a side view of an exemplary pet food bandolier.

FIGS. 5A and 5B show portions of an exemplary bandolier 40 of the present invention. Bandolier 40 includes shaped articles 41 and an interconnecting web or ribbon of flash 42 connecting each shaped article 41 into a continuous, monolithic structure. For embodiments in which opposing cavities 32 are formed in rollers 30, flash 42 is located near the centerline of the articles 41. Alternatively, in embodiments in which a cavity is formed in only one roller, flash 42 is located near the top or bottom of the bandolier 40.

Figure 5C:
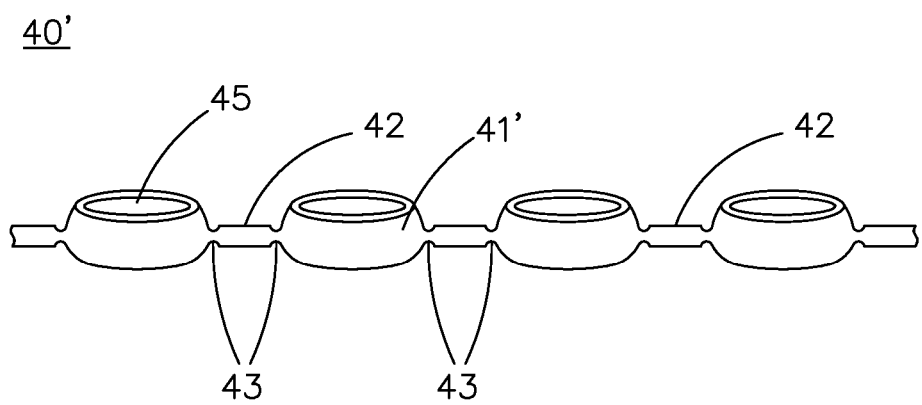
FIG. 5C shows a schematic, perspective view of an alternative embodiment of an exemplary bandolier with articles having a cup-shape.

Articles 41 may constitute a finished piece or may be formed as an intermediate that can undergo additional processing. For example, FIG. 5C illustrates an article 41' having a cup shape that defines a pocket or void 45. In additional downstream steps, the void may be filled with a second comestible product having attributes such as flavor, color, texture, and the like according to the desired characteristics of the product.

The size and shape of shaped articles may vary depending upon the needs of the user and correspond to those previously recited with respect to the dimension of cavity 32. The weight of shaped articles 41 may be between about 1 and about 10 grams, preferably between about 2 and about 8 grams, preferably between about 4 and about 6 grams. Bandolier 40 may comprise multiple rows 44 of shaped articles. As shown, bandolier has 3 rows 44 of shaped articles, but the number of rows 44 may vary depending upon the needs of the user. The thickness of flash 42 is preferably between about 0.01 inches and about 0.1 inches, preferably between about 0.03 inches and about 0.07 inches. The thickness of stress line 43 is preferably less than the thickness of flash 42. For example, the thickness of stress line 43 may be between about 0.001 and about 0.05 inches, preferably between about 0.005 and about 0.01 inches. Stress line 43 provides for a consistent breakage point for shaped article 41 to separate from flash 42. Preferably, bandolier 40 is designed to minimize the amount of flash 42 in bandolier 40. Suitable amounts of flash 42 in bandolier 40 is between about 2 and about 15 weight percent of the bandolier, preferably between about 5 and about 10 weight percent of the bandolier. The particular thickness of flash for a particular application may depend on various parameters, for example brittleness, modulus of elasticity, hardness, stickiness, and like material parameters, and material temperature at the roller outlet and desired temperature for separation, belt and roller speed, and like process parameters, that will be understood by persons familiar with food processing technology.

Upon alignment of rollers 30, the distance between rims 35 of the opposing rollers is less than the distance between surfaces 31. Because rims 35 extend radially outward from surface 31, rims 35 form a stress line 43 on bandolier 40 surrounding the article. Stress line 43 is a weakened area between the full-thickness flash 42 and the body of article 41. The term "stress line" encompasses the weakened line 43 formed as a thin portion relative to surrounding structure, as perforations through flash 42, ridges or quilting pressed into the surface of flash 42, coining or compression to change the mechanical properties (such as strength or brittleness), and the like.

In certain embodiments, the distance between rims 35 upon compression is between about 0.001 and about 0.05, preferably between about 0.005 and about 0.01. Cavity 32 has features 34 formed as protrusions or recesses relative to surrounding surfaces. In certain embodiments, these features may produce high resolution features in the shaped article. The term "high resolution" as used herein generally refers to features that are sharp and finely detailed in the finished article. For example, the characteristic length (that is, height, thickness, or diameter of an embossed or debossed feature, depending on the configuration of the particular feature or article) is less than about 0.1 inches at an aspect ratio (typically, height by width) of at least about 2:1. The ability to form articles with high resolution features using methods of the present invention is dependent upon the amount of force applied to the rollers, the temperature of the comestible material, and the source of comestible material, among other factors. For example, suitable amounts of force applied to the rollers to form high definition articles may be between about 500 lbs and about 4000 lbs. Suitable temperatures of the comestible material to form high definition articles may be between about 100° F. and about 300° F. Suitable comestible materials for forming high resolution articles include those having a particle size of less than about 1 mm and a viscosity of at least about 50,000 cps.

Additionally, cavities 32 arc formed having a draft angle θ provided for ease of release of the article from 32 cavity. In certain embodiments, draft angle θ is between about 1° and about 20°, preferably between about 5° and about 15°, more preferably between about 8° and about 10°. In other embodiments, the surface of cavity 32 may be coated to provide for easier release of the article.

Figure 6A:
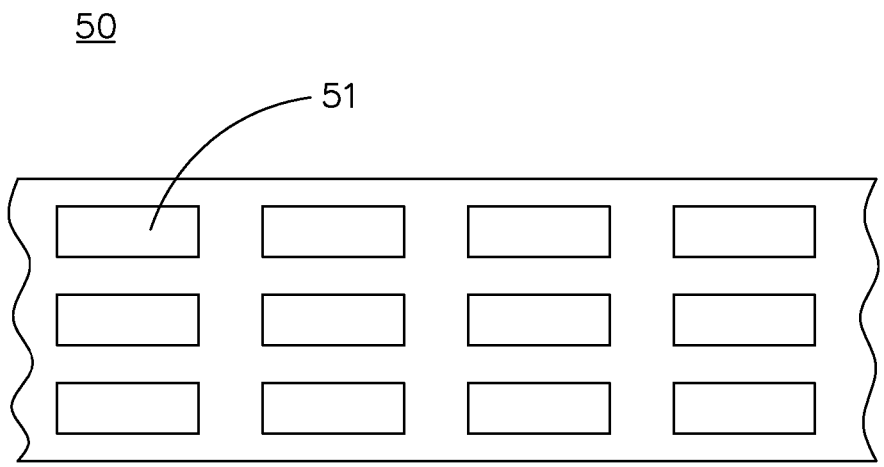
FIG. 6A shows a top view of an exemplary conveyer belt for manufacturing shaped, comestible pet food articles.
Figure 6B:
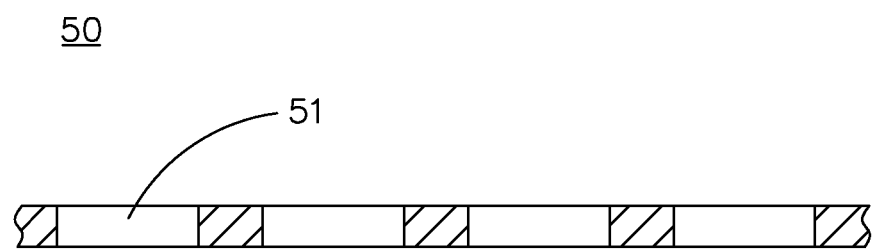
FIG. 6B shows a side view of an exemplary conveyer belt for manufacturing shaped, comestible pet food articles.

After formation between rollers 30, bandolier 40 is transferred to conveyer belt 50. FIGS. 6A and 6B show portions of an exemplary conveyer belt 50 of the present invention. Belt 50 has apertures 51 designed to receive shaped articles 41 such that bandolier 40 is registered. As used herein, the term aperture encompasses pockets, holes, openings, and the like. To facilitate transfer of bandolier 40 to conveyer belt 50 and to promote positioning, vacuum may be used. For example, a manifold supplying vacuum underneath conveyer belt 50 may be used to secure bandolier 40 to the conveyer belt 50 and place shaped articles 41 into apertures 51. Conveyer belt 50 may move at a linear speed that is matched to the speed of the extruder and the rotational speed of the rollers, among other factors. In certain embodiments, conveyer belt 50 moves at a linear speed of between about 5 and about 40 feet per minute, preferably between about 10 and about 30 feet per minute, more preferably between about 15 and about 25 feet per minute. In embodiments wherein the article comprises a pocket, a second comestible material may be added to the pocket while bandolier 40 is on conveyer belt 50. The second comestible material may be the same as the comestible material or may be different. Suitable second comestible materials may include medicaments or other materials suitable for the improvement of pet health. Once the second comestible material is added to the pocket, an optional comestible covering may be applied over the second comestible material to form an article having an enclosed second comestible material.

Optionally, conveyer belt 50 transfers bandolier 40 through cooling apparatus 60. Preferably, flash 42 is cooled in cooling apparatus 60 such that the temperature of stress lines 43 is less than its glass transition temperature. For example, the temperature of stress line 43, after cooling, may be between about −50° F. and about 80° F., preferably between about 20° F. and about 70° F., more preferably between about 40° F. and about 60° F. The temperature of stress line 43 may be reduced by at least about 10° F. from its initial temperature, preferably at least about 20° F., more preferably at least about 30° F. Cooling flash 42 such that the temperature of stress line 43 is less than its glass transition temperature provides for stress lines 43, to increase in brittleness (compared with the brittleness of stress line 43 before cooling), promoting breaking and allowing for clean separation of shaped article 41 from flash 42. In a preferred embodiment, cooling apparatus 60 is a high velocity air cooling apparatus, preferably a high velocity cooling tunnel.

Figure 7:
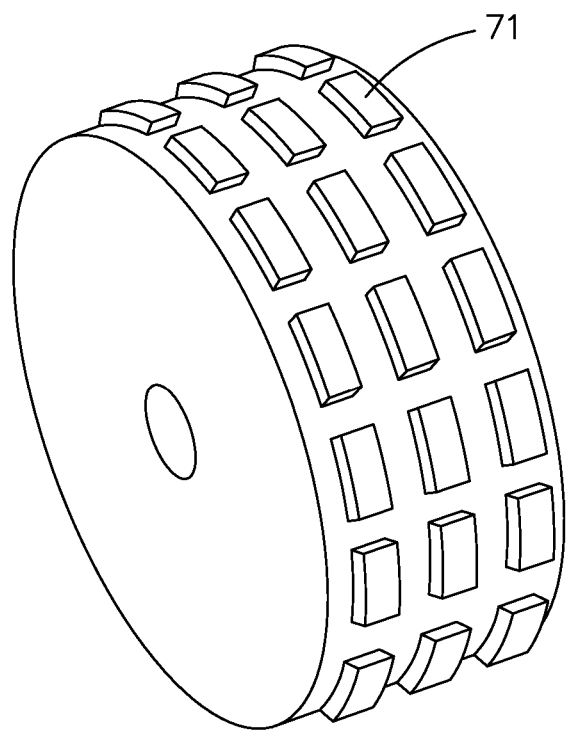
FIG. 7 shows an exemplary punch roller.

Following cooling, bandolier is transferred to rotary punch 70. FIG. 7 shows an exemplary rotary punch having punch surfaces 71. Punch surfaces 71 may have the approximate shape of articles 41, a smooth surface for contacting articles 41 at a relative thick or strong portion, or an outline of articles 41 for contacting each article 41 near its periphery or for contacting stress lines 43. In this regard, punch surfaces 71 contact shaped articles 41 and separate them from flash 42. The separated shaped articles 41 pass through apertures 51 in conveyer belt 50. The separated shaped articles 41 may be directly packaged or they may be subsequently processed. Optionally, flash 42 is collected and recycled as raw material during the extrusion process, for example flash 42 may be collected and stored for subsequent recycling. The flash may be cooled, ground, and fed back into the extruder. In other embodiments it is immediately returned to the extruder for conversion into comestible material.

Shaped articles 41 may have various uses, for example, they may be used for food/snacks for human consumption. In preferred embodiments, shaped articles 41 are suitable for consumption by pets, i.e., pet food, snacks, treats, and the like for dogs, cats, and any other domesticated animal. In yet other embodiments, the pet food is suitable for providing health benefits to pets, such as, for example, improved dental hygiene.

As used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Also, it is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Moreover, the specification discusses several advantages and benefits of the disclosed methods and products over prior art; the present invention is not limited by the discussion of the advantages and benefits, which merely illustrate some possible attributes. Rather, the claims define the scope of the invention.

What is claimed:

1. A method for manufacturing shaped, comestible articles comprising:
   a. providing a pair of rollers having a surface, at least one of the rollers having cavities extending inwardly from the roller surface, each cavity at least partially surrounded by a rim, said rim extending above said roller surface;
   b. feeding a comestible material, having a temperature greater than its glass transition temperature, to the rollers;
   c. rotating the rollers to compress the material such that (i) material fills the cavities to form shaped articles (ii) material forms flash connecting the shaped articles together, (iii) and each said rim forms a stress line in the flash about each article; and
   d. cooling the flash to reduce the temperature of the stress line to less than its glass transition temperature.

2. The method of claim 1, further comprising the step of separating the articles from the flash at the stress line to form individual product pieces.

3. The method of claim 1, further comprising the step of transferring the shaped articles and flash from the rollers to a conveyer belt, wherein the conveyer belt comprises apertures for receiving the articles.

4. The method of claim 3, further comprising the step of providing a vacuum to at least partially register the articles in the apertures.

5. The method of claim 1, wherein the cooling step is performed by high velocity air cooling apparatus directed toward the stress line.

6. The method of claim 1, wherein the rim is peripherally continuous about each cavity and the flash has a thickness of between about 0.01 to about 0.1 inches.

7. The method of claim 1, wherein the rims have a draft angle of between about 5 and about 15 degrees.

8. The method of claim 1, wherein the feeding step includes cooking and extruding the comestible material in an extruder.

9. The method of claim 1, wherein the temperature of the comestible material before compression is between about 180 and about 220° F.

10. The method of claim 1, further comprising the step of cooling the comestible material during the rotating step by cooled rollers.

11. The method of claim 2, wherein the product pieces are a pet food and have a thickness of between about .060 inches and about .75 inches, a length of between about 0.5 and about 1.5 inches, and a weight of between about 2 and about 6 grams.

12. The method of claim 8, further comprising the step of returning the flash after the separation step to the extruder.

13. The method of claim 1, wherein the comestible material is provided continuously.

14. The method of claim 1, wherein the articles comprise a void and further comprising the step of filling the void with a second comestible material.

15. The method of claim 14, wherein the second comestible material is different than the first comestible material.

16. The method of claim 14, further comprising enclosing the second comestible material by applying a comestible covering over the second comestible material.

17. The method of claim 1, wherein the shaped articles are high resolution.

18. The method of claim 1, wherein the rim extends outwardly from the surface of said roller.

19. The product of claim 18, wherein the rim extends outwardly from 0.1-0.5 inches above the roller surface.

20. The method of claim 1, wherein said stress line has a thickness from about 0.001 to 0.05 inches.

21. A method for manufacturing shaped, comestible articles comprising:
   a. providing a pair of rollers having a surface, at least one of the rollers having cavities extending inwardly from the roller surface, each cavity at least partially surrounded by a rim, said rim extending outwardly from said roller surface;

b. feeding a comestible material, having a temperature greater than its glass transition temperature, to the rollers;

c. rotating the rollers to compress the material such that (i) material fills the cavities to form shaped articles (ii) material forms flash connecting the shaped articles together, (iii)and each said rim forms a stress line in the flash about each article;

d. cooling the flash to reduce the temperature of the stress line to less than its glass transition temperature; and e. breaking the material along the stress line.

22. The method of claim 21, wherein said rim extends from 0.01 inches to about 0.1 inches above said roller surface.

* * * * *